United States Patent [19]

De Luca

[11] Patent Number: 4,715,830

[45] Date of Patent: Dec. 29, 1987

[54] WIRE STRAIN RELIEF AND CONDUCTOR RETAINER CONSTRUCTION FOR TELEPHONE BLOCKS

[75] Inventor: Paul V. De Luca, Plandome Manor, N.Y.

[73] Assignee: Porta Systems Corp., Syosset, N.Y.

[21] Appl. No.: 923,178

[22] Filed: Oct. 27, 1986

[51] Int. Cl.⁴ ............................................. H01R 9/24
[52] U.S. Cl. .................................. 439/709; 439/391; 439/723
[58] Field of Search ....... 339/198 R, 198 G, 198 GA, 339/99 R, 103 R, 103 M, 97 R, 97 P, 98; 439/888

[56] References Cited

U.S. PATENT DOCUMENTS

| | | | |
|---|---|---|---|
| 3,702,456 | 11/1972 | Patton | 339/98 |
| 4,101,189 | 7/1978 | Moser et al. | 339/103 M |
| 4,236,778 | 12/1980 | Hughes et al. | 339/198 R |
| 4,286,836 | 9/1981 | Rumps | 339/103 M |

Primary Examiner—Gil Weidenfeld
Assistant Examiner—Thomas M. Kline
Attorney, Agent, or Firm—Charles E. Temko

[57] ABSTRACT

The disclosure relates to an improved telephone connector block having quick clip contact element holder elements which support the contact elements in a given plane. The contact holder elements are modified so that they extend a greater distance outwardly of the quick clip terminals which they support to incorporate a conductor retaining area into which the free end of a conductor may be moved to be retained until subsequently engaged by a tool which then moves the conductor into the quick clip contact element and a corresponding strain relief area disposed immediately adjacent thereto in the respective contact holder element.

1 Claim, 4 Drawing Figures

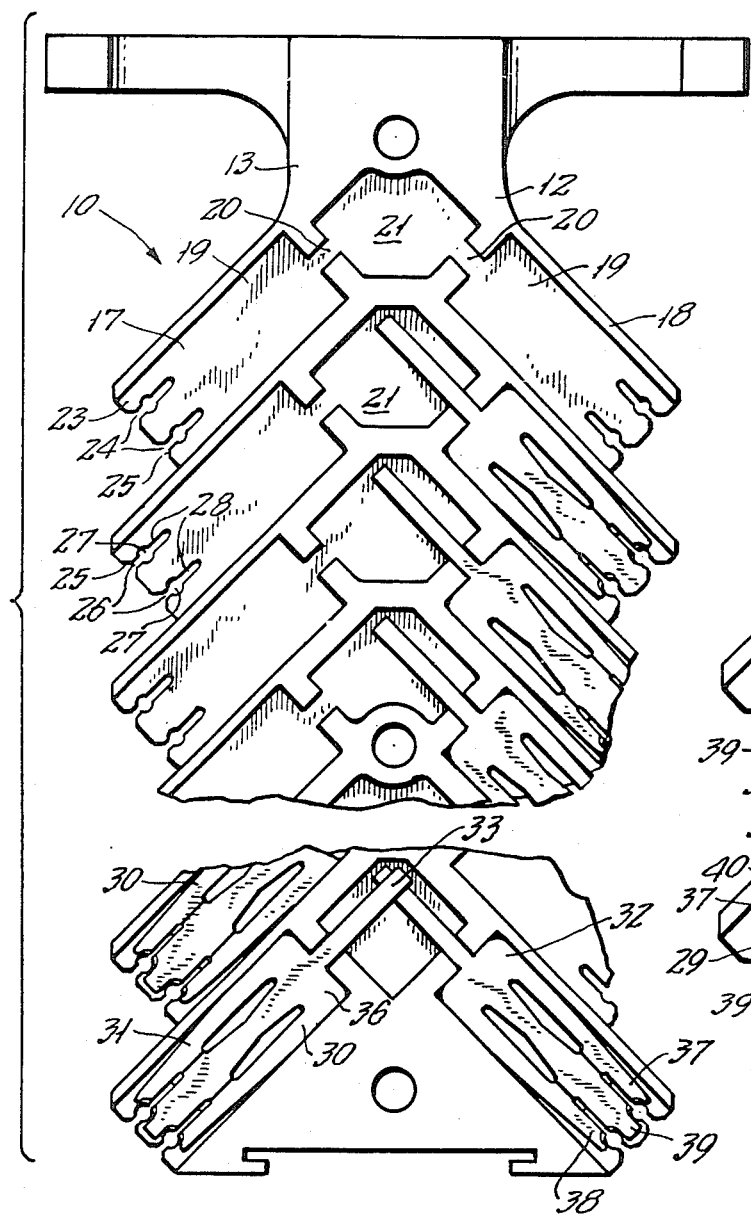
FIG. 1.
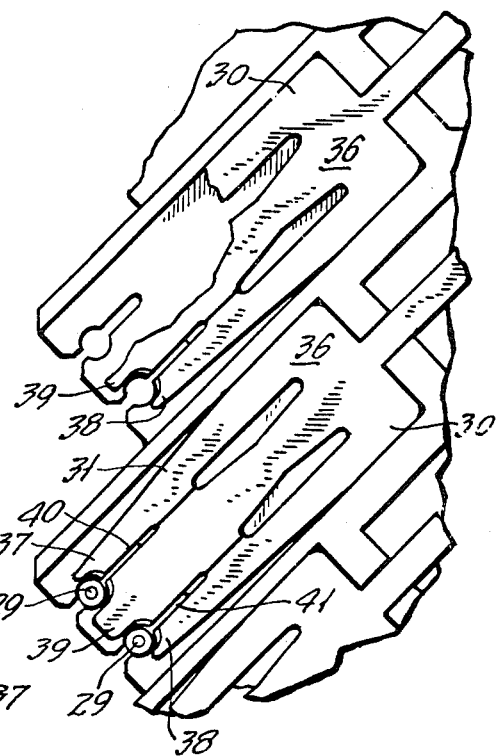
FIG. 4.
FIG. 2.
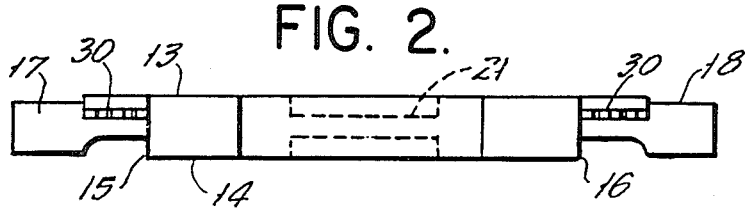
FIG. 3.

WIRE STRAIN RELIEF AND CONDUCTOR RETAINER CONSTRUCTION FOR TELEPHONE BLOCKS

RELATED INVENTION

Reference is made to my copending application Ser. No. 896,119; filed Aug. 13, 1986 under the title Laminar Type Telephone Connector Block now abandoned, which is assigned to the same assignee as the present application, and which discloses and claims a related invention.

BACKGROUND OF THE INVENTION

This invention relates generally to the field of telephony, and more particularly to an improved subscriber circuit connector block normally employed for interconnecting subscriber pairs to telephone company switching equipment. Devices of this general type are well known in the art, and the invention lies in specific constructional details which permit manufacture by assembling plural laminar elements to vary the effective capacity of an individual block, as well as improved convenience in installation and interconnection.

Laminar type construction in the manufacture of telephone connector blocks has been employed in the prior art, some of such constructions employing so-called quick clip terminals, the use of which has become standardized in the telephone industry. The present practice is to insert mold the connectors in place with the free ends projecting from the block to permit interconnection of conductors using an installation tool. The insert molding technique, of necessity, cannot provide insulative protection extending to the free ends of the quick clip connector terminals, nor can it provide for ready replacement of a damaged contact should such replacement become necessary. Further, once manufactured, the particular type of connector is not subject to modification for individual requirements of a user at a later date.

In my copending, above-identified application, Ser. No. 896,119, there is disclosed an improved telephone connector block of the class described which is particularly suited for a low cost of production, with a high degree of convenience in assembly using plural numbers of standardized components maintained in operative relation using threaded connecting members. An individual block comprises first and second end support elements and a number of individual planar contact holding elements each of which contains interconnected pairs of quick clip terminals, each interconnected pair accommodating a single subscriber circuit. The quick clip terminals are maintained in position solely by the juxtaposed condition of adjacent contact holder elements. The end support elements are threadedly engaged to maintain contact holder elements disposed therebetween. The contact holder elements support the quick clip contact elements throughout substantially the entire length of the latter, and provide insulative and strain relief protector functions as well.

While this construction affords a significant improvement over corresponding prior art construction, some difficulty has been encountered in the maintenance of the free ends of individual subscriber pairs in position adjacent the end of a corresponding quick clip terminal, so that large numbers of such pairs can be conveniently interconnected in serial fashion using a manually operated specialized tool for this purpose. In the construction disclosed in the above-mentioned application, there has been the tendency for the ends of conductors not to remain ready for engagement by the tool, owing to restorative forces caused by elastic memory in either the conductor or its insulative covering. Where it is necessary to interrupt the use of the tool in order to realign the end of the conductor for engagement therewith, substantial time is lost, and, in some cases, the terminal is interconnected with an incorrect conductor.

SUMMARY OF THE INVENTION

Briefly stated, the invention contemplates the provision in a telephone connector block of the type disclosed in the above-mentioned application in which the above-mentioned shortcoming has been accommodated. To this end, the contact holder elements which support the quick clip contact elements are modified so that they extend a greater distance outwardly of the quick clip terminals which they support, and incorporate a conductor retaining area into which the free end of the conductor may be moved to be retained until subsequently engaged by a tool which then moves the conductor into the quick clip and a corresponding strain relief area disposed immediately adjacent thereto.

BRIEF DESCRIPTION OF THE DRAWING

In the drawing, to which reference will be made in the specification, similar reference characters have been employed to designate corresponding parts throughout the several views.

FIG. 1 is a top plan view of an embodiment of the invention

FIG. 2 is a fragmentary side elevational view thereof as seen from the plane 2—2 in FIG. 1.

FIG. 3 is an end elevational view thereof, as seen from the upper portion of FIG. 1.

FIG. 4 is an enlarged fragmentary top plan view, corresponding to the left central portion of FIG. 1.

DETAILED DESCRIPTION OF THE DISCLOSED EMBODIMENT

In acordance with the invention, reference character 10 designates a contact holder element of configuration corresponding to that disclosed in my above-mentioned pending application The element 10 includes a main body 12 bounded by an upper surface 13, a lower surface 14 and first and second longitudinal edges 15 and 16, respectively. Extending from the lower surface 14 are a pair of laterally extending flanges 17 and 18, each having upwardly facing angularly disposed rectangular recesses 19 having at inner ends thereof communicating channels 20 leading to centrally disposed recesses 21.

At the open outer ends 23 of the recesses 19 are a pair of aligned slots 24 which extend inwardly parallel to the axis of the recesses 19. The slots 24 perform, in addition to the strain relief function disclosed in my pending application, an additional function, that of holding in releasable fashion the free end of a subscriber pair conductor in position for ready engagement with a conductor seating tool (not shown) of known type.

To this end, each of the slots 24 includes a first outer flanged portion 25, which may be of semi-circular configuration. The first portion leads to a second relatively narrow elongate portion 26 of width less than that of a sheathed or insulation carrying conductor 29. The second portion 26, in turn, communicates with a third portion 27 in the form of a generally circular recess of diameter slightly less than the diameter of the conductor 29. A fourth portion 28 communicates with the portion 27 and is of a width corresponding to that of the second portion 26 to provide the strain relief function as the bare conductor is positioned within a corresponding conductor retaining slot in an overlying quick clip conductor.

Corresponding metallic contact elements 30 are conventional quick clip connectors, each including first and second contact members 31 and 32, the wire wrap portions of which are interconnected at 33, as in the above copending application. Each of the contact members 31-32 includes a main body 36 supporting first and second outer tines 37 and 38 on either side of a central tine 39. The tines 37-39 define spreadable first and second conductor retaining slots 40 and 41 which, as known in the art, provide an insulation displacing function with the engagement of a conductor 29 therein.

During assembly, the conductors 29 are positioned as disclosed in the above-identified copending application. The ends of the subscriber pair conductors 42, instead of being merely positioned opposite the conductor retaining slots 40 and 41, are first engaged within the slots 24 by pushing the conductor past the first and second portions 25 and 26 to become resiliently lodged in the third portion 27, where they may remain until engagement by the installation tool which pushes the ends of the conductor into the slots 40 or 41, wherein the insulation becomes displaced, and electrical communication established. In this position, the fourth portion 28 performs a strain relief function identical to that disclosed in the copending application.

However, as contrasted with the structure disclosed in the copending application, the end of the conductor 29 is resiliently maintained in proper position for engagement with the installation tool, and is not free to displace itself out of alignment with a slot 40-41, the occurrence of which requires additional effort on the part of the craftsperson using the engagement tool. The possibility of interconnecting an incorrect conductor with a particular quick clip connector is also eliminated.

I wish it to be understood that I do not consider the invention limited to the precise details of structure shown and set forth in this specification, for obvious modifications will occur to those skilled in the art to which the invention pertains.

I claim:

1. In a telephone connector block for interconnecting individual subscriber pairs to central office equipment, including at least one generally planar contact holding element, a plurality of contact elements supported upon said contact holding element, said contact holding element having a longitudinal axis and first and second surfaces, one of said surfaces having a plurality of laterally extending recesses, said contact elements each being positioned within a corresponding recess, each of said contact elements having a conductor retaining slot extending from an edge thereof which defines a quick clip type of connector, the improvement comprising: said contact holding elements enclosing substantially the entire length of said contact elements, and having openings therein corresponding to the conductor retaining slots in said quick clip terminals, said openings including a first end portion of width corresponding to an insulated conductor, a second portion of relatively narrower width, a third portion of generally arcuate configuration and of diameter corresponding to the width of said first portion, and a fourth portion of narrower width corresponding to the width of said second portion, said contact elements being positioned in said recesses such that said edge is positioned adjacent the junction of said third and forth portions of said openings and said retaining slot overlies and extends along the length of said forth portion, said third portion forming a recess for resiliently retaining the end of a conductor in abutted relation relative to the open end of said conductor retaining slot of said quick clip connector; whereby upon assembly of plural subscriber pair conductors within said block, and prior to engagement with a given clip connector, the ends of said conductor may be positioned and resiliently maintained at the end of a corresponding slot for engagement by a tool serving to engage said conductor within said slot.

* * * * *